United States Patent
Liang et al.

(10) Patent No.: US 12,306,858 B2
(45) Date of Patent: May 20, 2025

(54) INFORMATION GENERATION METHOD, APPARATUS, ELECTRONIC DEVICE, AND COMPUTER-READABLE MEDIUM

(71) Applicants: BEIJING WODONG TIANJUN INFORMATION TECHNOLOGY CO., LTD., Beijing (CN); BEIJING JINGDONG CENTURY TRADING CO., LTD., Beijing (CN)

(72) Inventors: Jiahui Liang, Beijing (CN); Junwei Bao, Beijing (CN)

(73) Assignees: BEIJING WODOING TIANJUN INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 0 days.

(21) Appl. No.: 18/277,928

(22) PCT Filed: Dec. 21, 2021

(86) PCT No.: PCT/CN2021/140219
§ 371 (c)(1),
(2) Date: Aug. 18, 2023

(87) PCT Pub. No.: WO2022/174669
PCT Pub. Date: Aug. 25, 2022

(65) Prior Publication Data
US 2024/0134892 A1 Apr. 25, 2024
US 2024/0232237 A9 Jul. 11, 2024

(30) Foreign Application Priority Data
Feb. 19, 2021 (CN) .......................... 202110188846.2

(51) Int. Cl.
*G06F 16/33* (2025.01)
*G06F 16/332* (2019.01)
(Continued)

(52) U.S. Cl.
CPC ...... *G06F 16/3328* (2019.01); *G06F 16/3347* (2019.01); *G06F 40/40* (2020.01)

(58) Field of Classification Search
None
See application file for complete search history.

(56) References Cited

U.S. PATENT DOCUMENTS 9,857,960 B1 * 1/2018 Dennis .................... H04L 67/10
10,146,751 B1 12/2018 Zhang
(Continued)

FOREIGN PATENT DOCUMENTS

| CN | 111563117 A | 8/2020 |
|----|-------------|--------|
| CN | 111723215 A | 9/2020 |
| CN | 111914157 A | 11/2020 |
| CN | 113779316 A | 12/2021 |

OTHER PUBLICATIONS

Qi Song; Mining Summaries for Knowledge Graph Search; IEEE; vol. 30, No. 10; 2018;pp. 1887-1900.*
(Continued)

*Primary Examiner* — Ann J Lo
*Assistant Examiner* — Jermaine A Mincey

(57) ABSTRACT

The present disclosure provides an information generation method. The information generation method includes: obtaining a pre-constructed graph model related to a target item category, and serialized text data and structured text data related to a target item (401); performing word segmentation on the serialized text data to obtain a word set (402); matching a target word in the word set with parameter names in the graph model and generating a matched graph model according to matching results (403); generating a (Continued)

fused graph model according to the structured text data and the matched graph model (404); and generating summary information of the target item according to the fused graph model (405).

19 Claims, 7 Drawing Sheets

(51) Int. Cl.
*G06F 16/334* (2025.01)
*G06F 40/20* (2020.01)
*G06F 40/30* (2020.01)
*G06F 40/40* (2020.01)

(56) References Cited

U.S. PATENT DOCUMENTS

2010/0049770 A1* 2/2010 Ismalon .............. G06F 16/3325
707/765
2017/0371856 A1* 12/2017 Can .................. G06V 30/19173
2023/0186120 A1* 6/2023 Zhao ...................... G06N 5/022
706/45

OTHER PUBLICATIONS

International Search Report of PCT/CN2021/140219.
Written Opinion of PCT/CN2021/140219.

* cited by examiner

INFORMATION GENERATION METHOD, APPARATUS, ELECTRONIC DEVICE, AND COMPUTER-READABLE MEDIUM

CROSS-REFERENCE TO RELATED APPLICATIONS

This patent application is a U.S. National Stage of International Application No. PCT/CN2021/140219, filed on Dec. 21, 2021, which claims the priority to Chinese Patent Application No. 202110188846.2, filed on Feb. 19, 2021, and entitled "Information Generation Method and Apparatus, Electronic Device, and Computer-Readable Medium", the entire disclosures of which are hereby incorporated by reference.

TECHNICAL FIELD

Embodiments of the present disclosure relate to the field of computer technologies, and in particular, to an information generation method and apparatus, an electronic device, and a computer-readable medium.

BACKGROUND

At present, conventional item search and recommendation technology applications have been unable to better meet users' growing demand. When browsing recommended systems, users often face a problem of information explosion. Users desire to quickly understand products through some excellent item summaries A summary of an item is generally generated based on a recurrent neural network. However, the recurrent neural network can only model sequential text information, because item information includes not only an unstructured text sequence but also structured information. However, it is difficult for the recurrent neural network to directly model structured input. At present, the processing method still processes the structured input as string sequences, which may lose structured information to reduce the expression ability of a model.

SUMMARY

The summary of the present disclosure is intended to briefly introduce concepts, which will be described in detail in specific implementations later. The summary of the present disclosure is neither intended to identify key or necessary features of the claimed technical solutions, nor intended to limit the scope of the claimed technical solutions.

Some embodiments of the present disclosure provide an information generation method and apparatus, a device, and a computer-readable medium to solve the technical problems mentioned in the background above.

First, some embodiments of the present disclosure provide an information generation method, the method including: obtaining a pre-constructed graph model related to a target item category, and serialized text data and structured text data related to a target item, where the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information; performing word segmentation on the serialized text data to obtain a word set; matching a target word in the word set with the parameter names in the graph model and generating a matched graph model according to matching results; generating a fused graph model according to the structured text data and the matched graph model; and generating summary information of the target item according to the fused graph model.

Optionally, the matching a target word in the word set with the parameter names in the graph model and generating a matched graph model according to matching results includes: matching the target word in the word set with the parameter names in the graph model to obtain the matching results; and generating the matched graph model according to the matching results and target edges in the graph model, where the target edges are edges in the graph model that represent correlation information between the target word and the parameter names corresponding to the target word.

Optionally, the generating summary information of the target item according to the fused graph model includes: transforming the fused graph model into a corresponding vector matrix; determining a vector corresponding to each node in the fused graph model, where the vector corresponding to each node represents feature information of the parameter name or parameter content information; and generating the summary information of the target item according to the vector matrix and the vector corresponding to each node.

Optionally, the generating the summary information of the target item according to the vector matrix and the vector corresponding to each node includes: inputting the vector matrix and the vectors corresponding to respective nodes in the fused graph model into a pre-trained graph convolutional network to obtain a first output result; encoding the first output result to obtain a second output result; and decoding the second output result to obtain the summary information of the target item.

Optionally, the encoding the first output result to obtain a second output result includes: inputting the first output result into a pre-trained encoding network for processing temporal text data to obtain the second output result.

Optionally, the decoding the second output result to obtain the summary information of the target item includes: inputting the second output result to a pre-trained decoding network for processing temporal text data to obtain the summary information of the target item.

Optionally, the numerical values corresponding to the edges in the graph model are determined through the following steps: obtaining item information of each item under the target item category, where the item information includes a parameter name and at least one parameter value; determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

In a second aspect, some embodiments of the present disclosure provide an information generation apparatus, the apparatus including: an obtaining unit, configured to obtain a pre-constructed graph model related to a target item category, and serialized text data and structured text data related to a target item, where the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information; a word segmentation unit, configured to perform word segmentation on the serialized text data to obtain a word set; a matching and generation unit, configured to match a target word in the word set with the parameter names in the graph model and generate a matched graph model according to matching results; a first generation unit, configured to generate a fused graph model according to the structured text data and the matched graph model; and a second generation unit, configured to generate summary information of the target item according to the fused graph model.

Optionally, the matching and generation unit is further configured to: match the target word in the word set with the parameter names in the graph model to obtain the matching results; and generate the matched graph model according to the matching results and target edges in the graph model, where the target edges are edges in the graph model that represent correlation information between the target word and the parameter names corresponding to the target word.

Optionally, the second generation unit is further configured to: transform the fused graph model into a corresponding vector matrix; determine a vector corresponding to each node in the fused graph model, where the vector corresponding to each node represents feature information of the parameter name or parameter content information; and generate the summary information of the target item according to the vector matrix and the vector corresponding to each node.

Optionally, the second generation unit is further configured to: input the vector matrix and the vectors corresponding to respective nodes in the fused graph model into a pre-trained graph convolutional network to obtain a first output result; encode the first output result to obtain a second output result; and decode the second output result to obtain the summary information of the target item.

Optionally, the second generation unit is further configured to: input the first output result into a pre-trained encoding network for processing temporal text data to obtain the second output result.

Optionally, the second generation unit is further configured to: input the second output result to a pre-trained decoding network for processing temporal text data to obtain the summary information of the target item.

In a third aspect, some embodiments of the present disclosure provide an electronic device, including: one or more processors; and a storage apparatus, storing one or more programs thereon, where the one or more programs, when executed by the one or more processors, enable the one or more processors to implement the method in the first aspect.

In a fourth aspect, some embodiments of the present disclosure provide a computer-readable medium, storing a computer program thereon, where the method in the first aspect is implemented when the program is executed by a processor.

BRIEF DESCRIPTION OF DRAWINGS

The above and other features, advantages and aspects of various embodiments of the present disclosure will become more apparent with reference to the accompanying drawings and specific implementations below. The same or similar reference numerals throughout the drawings denote the same or similar elements. It should be understood that the drawings are schematic and the originals and elements are not necessarily drawn to scale.

DETAILED DESCRIPTION OF EMBODIES

Figure 1:
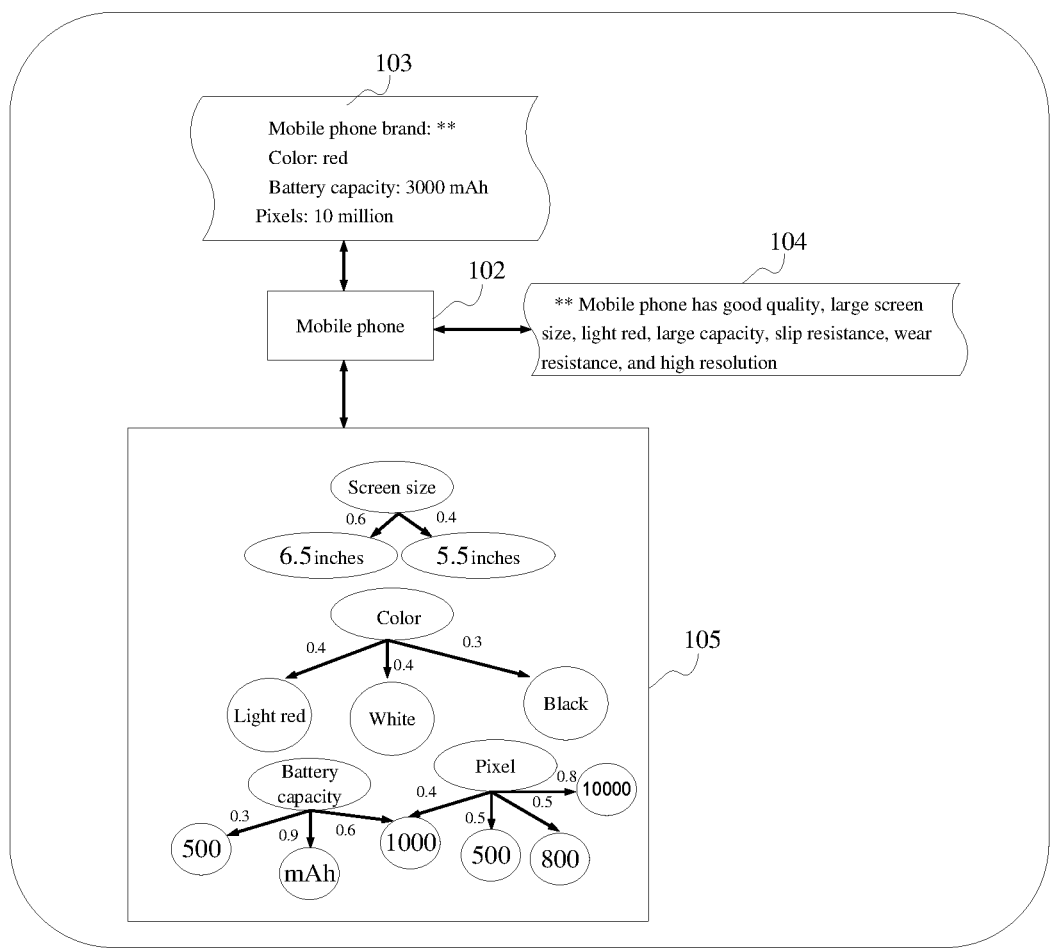
FIGS. 1-3 are schematic diagrams of an application scenario of an information generation method according to some embodiments of the present disclosure.

Embodiments of the present disclosure will be described in more detail below with reference to the accompanying drawings. Although some embodiments of the present disclosure are shown in the drawings, it should be appreciated that the present disclosure may be implemented in various forms and should not be construed as limited to the embodiments described here. Instead, these embodiments are provided for more thorough and complete understanding of the present disclosure. It should be understood that the drawings and embodiments of the present disclosure are merely illustrative, but are not intended to limit the scope of the present disclosure.

In addition, it should be noted that, for the convenience of description, only the parts related to the relevant invention are shown in the drawings. The embodiments in the present disclosure and the features in the embodiments may be combined with each other on a non-conflict basis.

It should be noted that the concepts such as "first" and "second" mentioned in the present disclosure are only used to distinguish different apparatuses, modules or units, and are not intended to limit the order or interdependence of the functions performed by these apparatuses, modules or units.

It should be noted that the modifications of "one" and "a plurality of" mentioned in the present disclosure are illustrative rather than restrictive, and those skilled in the art should understand that unless otherwise explicitly stated in the context, "one" and "a plurality of" should be understood as "one or more".

Names of messages or information exchanged between a plurality of apparatuses in implementations of the present disclosure are for illustrative purposes only and are not intended to limit a scope of these messages or information.

The present disclosure will be described below in detail with reference to the drawings and in conjunction with embodiments.

Figure 2:
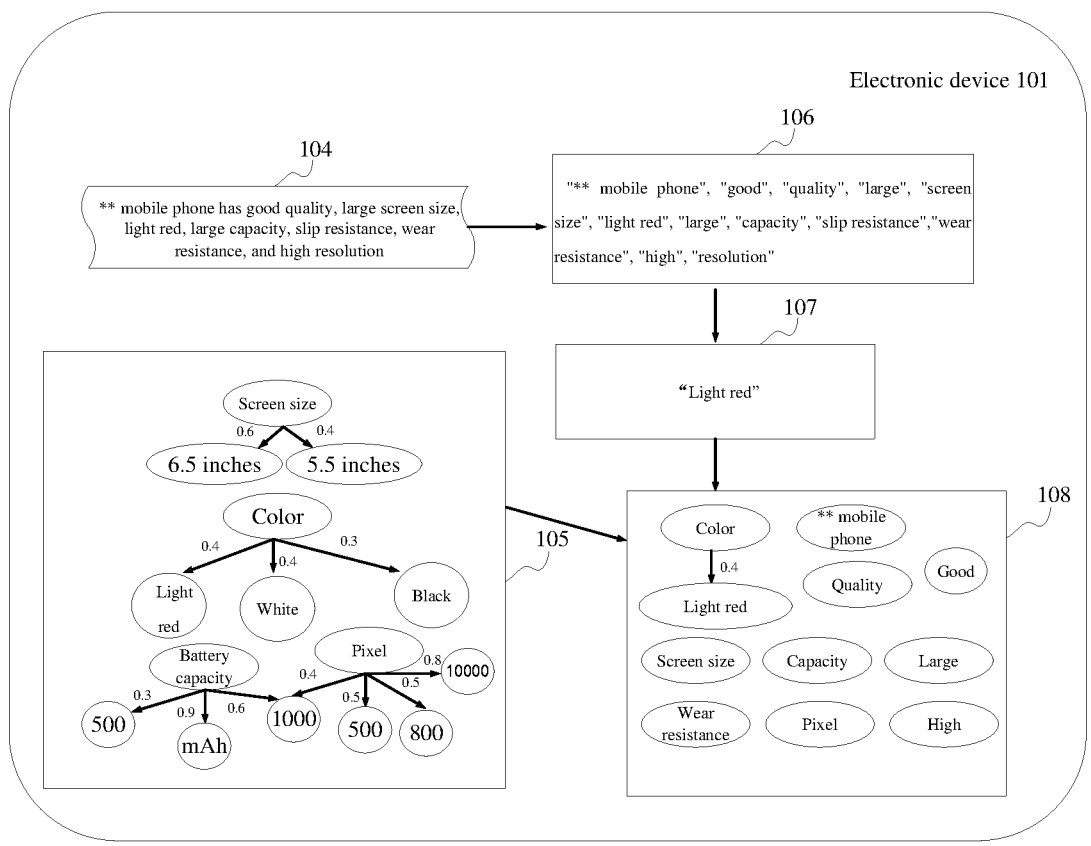
Figure 3:
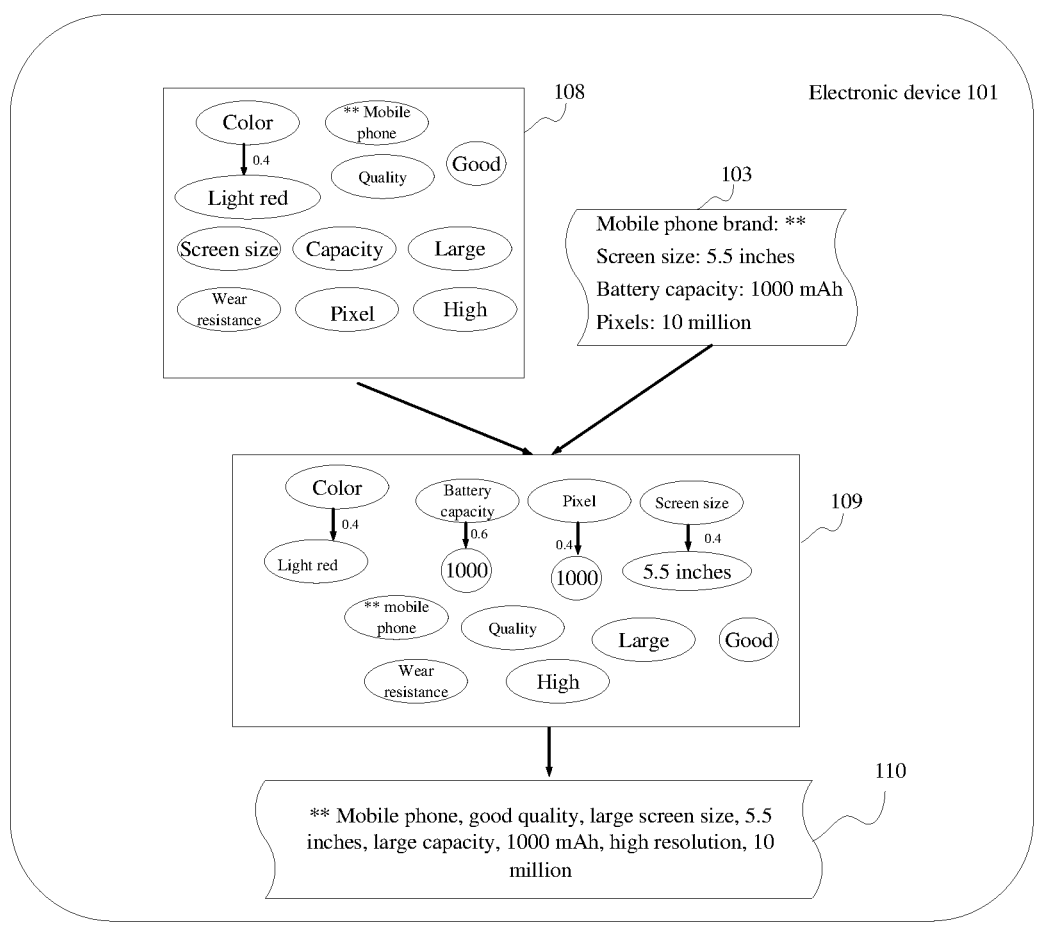

FIGS. 1-3 are schematic diagrams of an application scenario of an information generation method according to some embodiments of the present disclosure.

As shown in FIGS. 1-3, an electronic device 101 may first obtain a pre-constructed graph model 105 related to a target item category, and serialized text data 104 and structured text data 103 related to a target item 102. The graph model 105 represents a correlation between parameter names and parameter content information of the target item category, nodes in the graph model 105 represent the parameter names or parameter content information of the target item category, and numerical values corresponding to edges in the graph model 105 represent correlation information between the parameter names and the parameter content information. In this application scenario, the graph model 105 includes: "Screen size→6.5 inches, correlation information: 0.6; Screen size→5.5 inches, correlation information: 0.4; Color→light red, correlation information: 0.4; Color→white, correlation information: 0.4; Color→black, correlation information: 0.3; Battery capacity→500, correlation information: 0.3; Battery capacity→mHh, correlation information: 0.9; Battery capacity→1000, correlation information: 0.6; Pixels→500, correlation information: 0.5; Pixels→1000, correlation information: 0.4; Pixels→800, correlation information: 0.5; Pixels→10000, correlation information: 0.8". The target item 102 may be: "Mobile phone". The serialized text data 104 may be: "Mobile phone brand: \*\*; Color: red; Battery capacity: 3000 mAh; Pixels: 10 million". The structured text data 103 may include: "\*\*mobile phone has good quality, large screen size, light red, large capacity, slip resistance, wear resistance, and high resolution". As shown in FIG. 2, word segmentation is then performed on the serialized text data 104 to obtain a word set 106. Further, a target word 107 in the word set 106 is matched with the parameter names in the graph model 105, and a matched graph model 108 is generated according to matching results. In this application scenario, the word set 106 may include: "\*\*mobile phone", "good", "quality", "large", "screen size", "light red", "large", "capacity", "slip resistance", "wear resistance", "high" and"resolution". The target word 107 may be: "Light red". The matched graph model 108 may include: "Color→light red, correlation information: 0.4; \*\*mobile phone; Quality; Good; Screen size; Capacity; Large; Wear resistance; High; Resolution". As shown in FIG. 3, next, a fused graph model 109 is obtained according to the structured text data 103 and the matched graph model 108. Finally, summary information 110 of the target item 102 is generated according to the fused graph model 109. In this application scenario, the fused graph model 109 may include: "Color→light red, correlation information: 0.4; Battery capacity→1000, correlation information: 0.6; Pixels→1000, correlation information: 0.4; Screen size→5.5 inches, correlation information: 0.4; \*\*mobile phone; Quality; Large; Good; Wear resistance; High". The summary information 110 may be: "\*\*mobile phone, good quality, large screen size, 5.5 inches, large capacity, 1000 mAh, high resolution, 10 million".

It should be noted that the electronic device 101 may be hardware or software. When the electronic device is hardware, it may be implemented as a distributed cluster including a plurality of servers or terminal devices, or as a single server or terminal device. When the electronic device is embodied as software, it may be installed in the above-listed hardware device and implemented as a plurality of software programs or software modules for providing distributed services, or as a single software program or software module. Specific limitations are not provided here.

It should be understood that the number of electronic devices in FIG. 1 is only illustrative. Any number of electronic devices may be configured according to implementation requirements.

Figure 4:
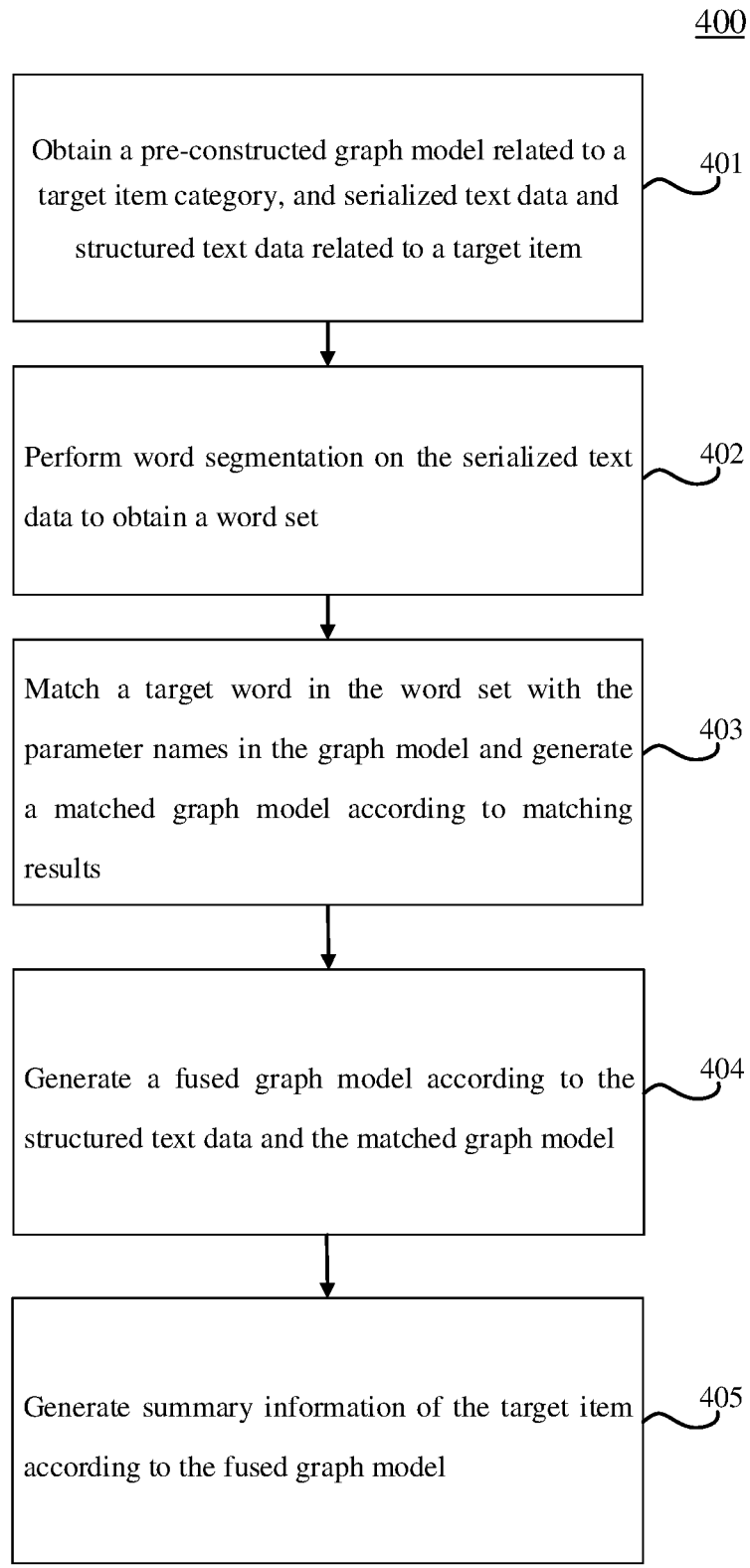
FIG. 4 is a flowchart of some embodiments of the information generation method according to the present disclosure.

Continue to refer to FIG. 4, which shows a flow 400 of some embodiments of an information generation method according to the present disclosure. The information generation method includes the following steps:

Step 401: Obtain a pre-constructed graph model related to a target item category, and serialized text data and structured text data related to a target item.

In some embodiments, an executive subject (such as the electronic device 101 shown in FIG. 1) of the information generation method may obtain, in a wired or wireless connection manner, the pre-constructed graph model related to the target item category, and the serialized text data and the structured text data related to the target item. The graph model represents a correlation between parameter names and parameter content information of the target item category, nodes in the graph model represent the parameter names or parameter content information of the target item category, and numerical values corresponding to edges in the graph model represent correlation information between the parameter names and the parameter content information. The correlation information may be numerical values between 0 and 1.

It should be pointed out that the wireless connection manner may include, but is not limited to, 3G/4G/5G connection, WiFi connection, Bluetooth connection, WiMAX connection, Zigbee connection, ultra wideband (UWB) connection, or other wireless connections now known or developed in the future.

Step 402: Perform word segmentation on the serialized text data to obtain a word set.

In some embodiments, the executive subject may perform word segmentation on the serialized text data to obtain the word set. As an example, the serialized text data may be segmented by Jieba to obtain the word set.

Step 403: Match a target word in the word set with the parameter names in the graph model and generate a matched graph model according to matching results.

In some embodiments, the executive subject may match the target word in the word set with the parameter names in the graph model and generate the matched graph model according to the matching results. The target word may be a word related to the parameter names in the graph model. As an example, the executive subject may transform the matching results into a form of a graph to obtain the matched graph model.

In some optional implementations of some embodiments, the matching a target word in the word set with the parameter names in the graph model and generate a matched graph model according to matching results may include the following steps:

Step 1: Match the target word in the word set with the parameter names in the graph model to obtain the matching results. As an example, the executive subject may first extract semantic information of the target word in the word set. Then, the parameter names in the graph model are traversed to determine parameter names related to the semantic information of the target word. Finally, the parameter names related to the semantic information of the target word are matched with the target word to obtain the matching results.

Step 2: Generate the matched graph model according to the matching results and target edges in the graph model. The target edges are edges in the graph model that represent correlation information between the target word and the parameter names corresponding to the target word. As an example, the executive subject may determine node information of the matched graph model according to the matching results. Finally, the target edges in the graph model are used as edges of the matched graph model to generate the matched graph model.

Step 404: Generate a fused graph model according to the structured text data and the matched graph model.

In some optional implementations of some embodiments, the executive subject may generate the fused graph model according to the structured text data and the matched graph model. As an example, the executive subject may fuse the structured text data into the matched graph model to obtain the fused graph model. Here, the fused graph model embodies structured text information related to the target item.

Step 405: Generate summary information of the target item according to the fused graph model.

In some embodiments, the executive subject may generate the summary information of the target item according to the fused graph model. As an example, the executive subject may first transform the fused graph model into corresponding vectors. Then, the corresponding vectors and vectors corresponding to respective nodes in the fused graph model are input into a pre-trained recurrent neural network to obtain the summary information of the target item.

In some optional implementations of some embodiments, the numerical values corresponding to the edges in the graph model are determined through the following steps:

Step 1: Obtain item information of each item under the target item category, where the item information includes a parameter name and at least one parameter value.

Step 2: Determine, according to the item information of each item, parameter content information corresponding to each parameter name and a frequency of appearance of each piece of the parameter content information in the item information of each item. Here, each piece of the item information of each item corresponds to at least one parameter name. Further, a parameter name set corresponding to the item information of each item may be determined. There may be a plurality of duplicate parameter names in the parameter name set. In this case, the parameter name set is de-duplicated to obtain a de-duplicated parameter name set. Here, each parameter name in the de-duplicated parameter name set corresponds to at least one piece of parameter content information. Accordingly, the frequency of appearance of each piece of the parameter content information in the item information of each item may be determined through the item information of each item.

Step 3: Determine the numerical values corresponding to the edges in the graph model by using a term frequency-inverse document frequency method according to the parameter content information corresponding to each parameter name and the frequency of appearance of each piece of the parameter content information.

Here, a main idea of the term frequency-inverse document frequency method is that if a word or phrase appears at a high term frequency (TF) and rarely appears in other articles, it is considered that the word or phrase has good classification ability and is suitable for classification. The inverse document frequency (IDF) mainly indicates that if there are fewer documents containing a word or phrase, the IDF is higher, showing that the word or phrase has good classification ability. Therefore, the importance of a word or phrase in an article may be computed by using the term frequency-inverse document frequency method.

The foregoing embodiments of the present disclosure have the following beneficial effects: the information generation method in some embodiments of the present disclosure can accurately and effectively generate the summary information of the target item by evaluating feature information of the serialized text data and the structured text data.

Specifically, a recurrent neural network can only model sequential text information, because item information includes not only an unstructured text sequence but also structured information. However, it is difficult for the recurrent neural network to directly model structured input. At present, the processing method still processes the structured input as string sequences, which may lose structured information to reduce the expression ability of a model. Based on this, the information generation method in some embodiments of the present disclosure may first obtain a pre-constructed graph model related to a target item category, and serialized text data and structured text data related to a target item. The graph model represents a correlation between parameter names and parameter content information of the target item category, nodes in the graph model represent the parameter names or parameter content information of the target item category, and numerical values corresponding to edges in the graph model represent correlation information between the parameter names and the parameter content information. Here, the graph model is used for determining the parameter names corresponding to the target word in the subsequent word set, so as to lay a foundation for the subsequent generation of the matched graph model. It should be noted that the graph model is obtained to transform the serialized text data related to the target item into structured data. Then, word segmentation is performed on the serialized text data to obtain the word set. Further, a target word in the word set is matched with the parameter names in the graph model and a matched graph model is generated according to matching results. Next, a fused graph model is generated according to the structured text data and the matched graph model. Here, the fused graph model embodies structured text information related to the target item. Finally, summary information of the target item is generated according to the fused graph model. Therefore, the foregoing information generation method can accurately and effectively generate the summary information of the target item by evaluating feature information of the serialized text data and the structured text data.

Figure 5:
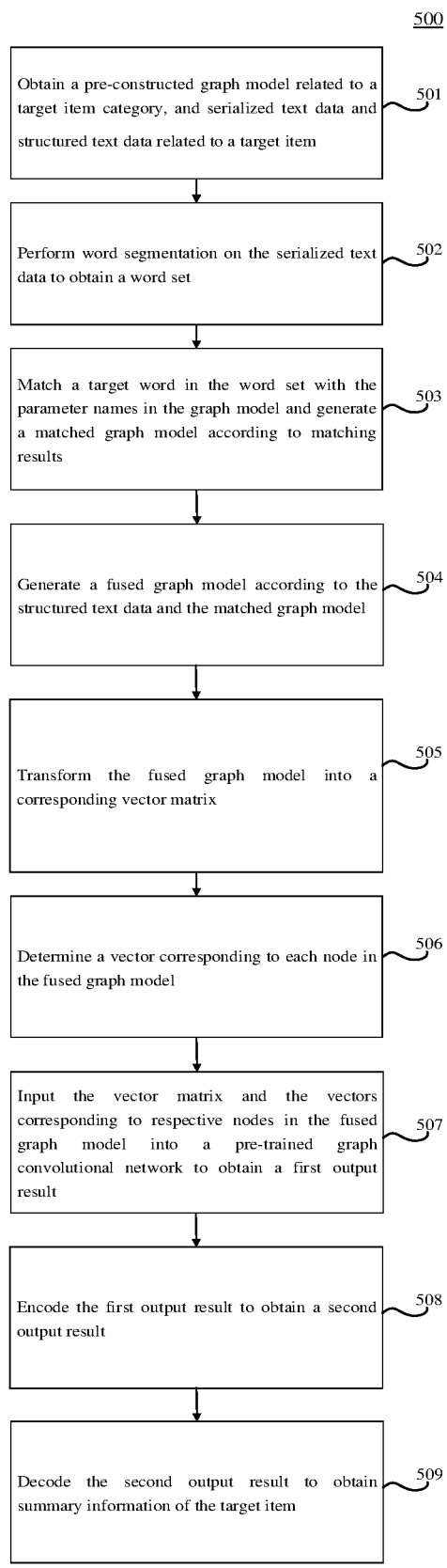
FIG. 5 is a flowchart of other embodiments of the information generation method according to the present disclosure.

Continue to refer to FIG. 5, which shows a flow 500 of other embodiments of the information generation method according to the present disclosure. The information generation method includes the following steps:

Step 501: Obtain a pre-constructed graph model related to a target item category, and serialized text data and structured text data related to a target item.

Step 502: Perform word segmentation on the serialized text data to obtain a word set.

Step 503: Match a target word in the word set with the parameter names in the graph model and generate a matched graph model according to matching results.

Step 504: Generate a fused graph model according to the structured text data and the matched graph model.

In some embodiments, specific implementations of steps 501-504 and resulting technical effects may be referenced to steps 401-404 in the embodiments corresponding to FIG. 4, and will not be repeated here.

Step 505: Transform the fused graph model into a corresponding vector matrix.

In some embodiments, the executive subject (such as the electronic device 101 shown in FIG. 1) may transform the fused graph model into the corresponding vector matrix. As an example, the executive subject may generate the corresponding vector matrix according to numerical values corresponding to respective edges in the fused graph model. The relationship between isolated nodes and other nodes may be represented as a numerical value 0.

Step 506: Determine a vector corresponding to each node in the fused graph model.

In some embodiments, the executive subject may determine the vector corresponding to each node in the fused graph model. The vector corresponding to each node represents feature information of the parameter name or parameter content information. As an example, the parameter name or parameter content information corresponding to each node in the fused graph model may be transformed into the corresponding vector by word embedding.

Step 507: Input the vector matrix and the vectors corresponding to respective nodes in the fused graph model into a pre-trained graph convolutional network to obtain a first output result.

In some embodiments, the executive subject may input the vector matrix and the vectors corresponding to respective nodes in the fused graph model into the pre-trained graph convolutional network (GCN) to obtain the first output result. The graph convolutional network may have a plurality of graph convolutional layers. The graph convolutional layers may aggregate neighbor information of each node through an adjacency matrix, thereby enhancing representation of the current node and improving accuracy of input modeling. Modeling on the plurality of graph convolutional layers can obtain information about multi-hop neighbors.

Step 508: Encode the first output result to obtain a second output result.

In some embodiments, the executive subject may encode the first output result to obtain the second output result. As an example, the executive subject may input the first output result into a pre-trained encoding network to obtain the second output result.

In some optional implementations of some embodiments, the executive subject may input the first output result to a pre-trained encoding network for processing temporal text data to obtain the second output result. The encoding network for processing temporal text data may be one of the following: a recurrent neural network (RNN) and a long short-term memory (LSTM).

Step 509: Decode the second output result to obtain summary information of the target item.

In some embodiments, the executive subject may decode the second output result to obtain the summary information of the target item. As an example, the executive subject may input the second output result into a pre-trained decoding network to obtain the summary information of the target item.

In some optional implementations of some embodiments, the executive subject may input the second output result to a pre-trained decoding network for processing temporal text data to obtain the summary information of the target item. The decoding network for processing temporal text data may be one of the following: a recurrent neural network and a long short-term memory network.

From FIG. 5, it may be seen that compared with the descriptions of some embodiments corresponding to FIG. 4, the flow 500 of the information generation method in some embodiments corresponding to FIG. 5 embodies the step of generating summary information of the target item according to the fused graph model. Therefore, the solutions described in these embodiments can generate the summary information of the target item more accurately and effectively.

Figure 6:
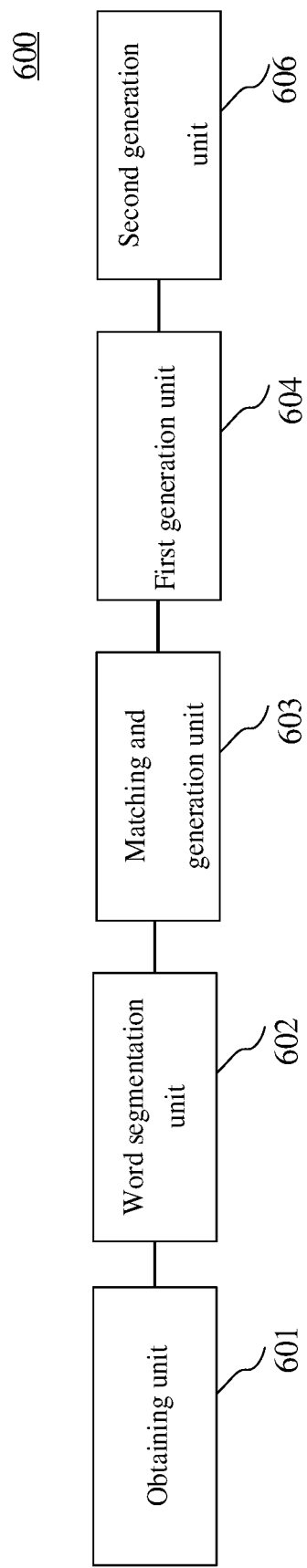
FIG. 6 is a schematic structural diagram of some embodiments of an information generation apparatus according to the present disclosure.

With continued reference to FIG. 6, as an implementation of the methods described in the foregoing figures, the present disclosure provides some embodiments of an information generation apparatus. These embodiments of the apparatus correspond to the embodiments of the method described in FIG. 4. The apparatus may be specifically applied to various electronic devices.

As shown in FIG. 6, the information generation apparatus 600 in some embodiments includes: an obtaining unit 601, a word segmentation unit 602, a matching and generation unit 603, a first generation unit 604, and a second generation unit 605. The obtaining unit 601 is configured to obtain a pre-constructed graph model related to a target item category, and serialized text data and structured text data related to a target item, where the graph model represents a correlation between parameter names of the target item category and numerical values of parameters, nodes in the graph model represent the parameter names or parameter content information of the target item category, and numerical values corresponding to edges in the graph model represent correlation information between the parameter names and the parameter content information. The word segmentation unit 602 is configured to perform word segmentation on the serialized text data to obtain a word set. The matching and generation unit 603 is configured to match a target word in the word set with the parameter names in the graph model and generate a matched graph model according to matching results. The first generation unit 604 is configured to generate a fused graph model according to the structured text data and the matched graph model. The second generation unit 605 is configured to generate summary information of the target item according to the fused graph model.

In some optional implementations of some embodiments, the matching and generation unit 603 of the information generation apparatus 600 may be further configured to match the target word in the word set with the parameter names in the graph model to obtain the matching results; and generate the matched graph model according to the matching results and target edges in the graph model, where the target edges are edges in the graph model that represent correlation information between the target word and the parameter names corresponding to the target word.

In some optional implementations of some embodiments, the second generation unit 605 of the information generation apparatus 600 may be further configured to transform the fused graph model into a corresponding vector matrix; determine a vector corresponding to each node in the fused graph model, where the vector corresponding to each node represents feature information of the parameter name or parameter content information; and generate the summary information of the target item according to the vector matrix and the vector corresponding to each node.

In some optional implementations of some embodiments, the second generation unit 605 of the information generation apparatus 600 may be further configured to input the vector matrix and the vectors corresponding to respective nodes in the fused graph model into a pre-trained graph convolutional network to obtain a first output result; encode the first output result to obtain a second output result; and decode the second output result to obtain the summary information of the target item.

In some optional implementations of some embodiments, the second generation unit 605 of the information generation apparatus 600 may be further configured to input the first output result into a pre-trained encoding network for processing temporal text data to obtain the second output result.

In some optional implementations of some embodiments, the second generation unit 605 of the information generation apparatus 600 may be further configured to input the second output result to a pre-trained decoding network for processing temporal text data to obtain the summary information of the target item.

It may be understood that the units described in the apparatus 600 correspond to the steps in the method described with reference to FIG. 4. Therefore, the operations, features, and beneficial effects described above for the method are also applicable to the apparatus 600 and the units included therein, and will not be repeated here.

Hereinafter, refer to FIG. 7, which shows a schematic structural diagram of an electronic device 700 adapted to implement some embodiments of the present disclosure. The electronic device shown in FIG. 7 is merely an example, and should not limit the function and scope of use of the embodiments of the present disclosure.

Figure 7:
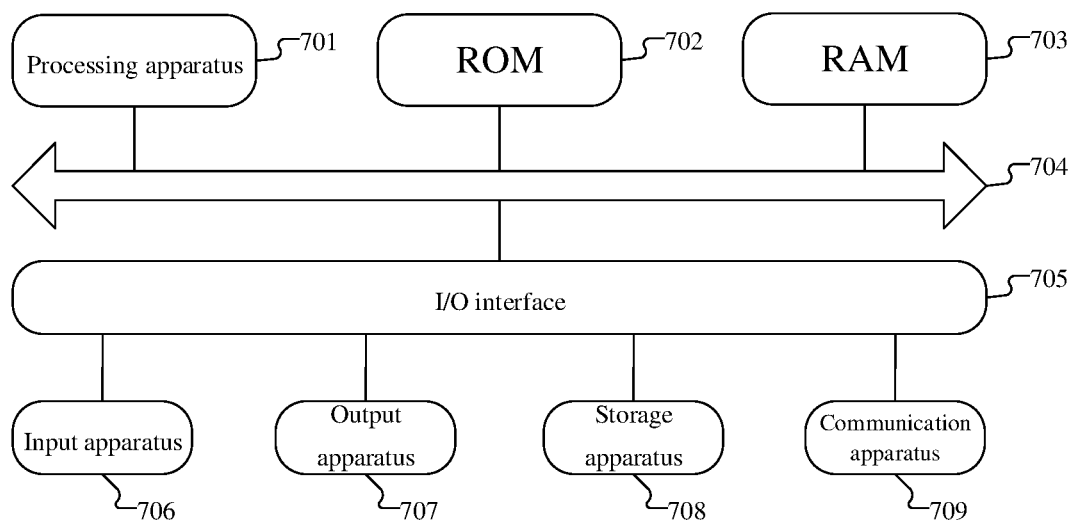
FIG. 7 is a schematic structural diagram of an electronic device adapted to implement some embodiments of the present disclosure.

As shown in FIG. 7, the electronic device 700 may include a processing apparatus (such as a central processing unit, a graphics processing unit, or the like) 701, which may perform various appropriate actions and processing according to a program stored in a read-only memory (ROM) 702 or a program loaded into a random access memory (RAM) 703 from a storage apparatus 707. The RAM 703 further stores various programs and data required for the operation of the electronic device 700. The processing apparatus 701, the ROM 702, and the RAM 703 are connected to each other by a bus 704. An input/output (I/O) interface 705 is also connected to the bus 704.

Generally, the following apparatuses may be connected to the I/O interface 705: an input apparatus 706 including a touch screen, a touch pad, a keyboard, a mouse, a camera, a microphone, an accelerometer, a gyroscope, or the like; an output apparatus 707 including a liquid crystal display (LCD), a speaker, a vibrator, or the like; a storage apparatus 708 including a magnetic tape, a hard disk, or the like; and a communication apparatus 709. The communication apparatus 709 may allow wireless or wired communication between the electronic device 700 and other device to exchange data. Although FIG. 7 illustrates the electronic device 700 having various apparatuses, it should be understood that all the illustrated apparatuses are not required to be implemented or have. More or less apparatuses may be alternatively implemented or have. Each block shown in FIG. 7 may represent an apparatus or a plurality of apparatuses as required.

In particular, according to some embodiments of the present disclosure, the process described above with reference to the flowchart may be implemented as a computer software program. For example, some embodiments of the present disclosure provide a computer program product, including a computer program loaded to a computer-readable medium, the computer program including program code for executing the method shown in the flowchart. In such embodiments, the computer program may be downloaded and installed from a network via the communication apparatus 709, or installed from the storage apparatus 708, or installed from the ROM 702. The computer program, when executed by the processing apparatus 701, implements the foregoing functions defined in the method of some embodiments of the present disclosure.

It should be noted that the computer-readable medium according to some embodiments of the present disclosure may be a computer-readable signal medium or a computer-readable storage medium or a combination of the two. For example, the computer-readable storage medium may be, but is not limited to, an electrical, magnetic, optical, electromagnetic, infrared, or semiconductor system, apparatus, or device, or any combination of the above. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical memory, a magnetic memory, or any suitable combination thereof. In the some embodiments of the present disclosure, the computer-readable storage medium may be any tangible medium containing or storing a program which may be used by an instruction execution system, apparatus, or device, or incorporated thereto. In some embodiments of the present disclosure, the computer-readable signal medium may include data signals in a base band or propagated as some of carriers, in which computer-readable program code is carried. The propagated data signals may be in many forms, including but not limited to, electromagnetic signals, optical signals, or any suitable combination thereof. The computer-readable signal medium may further be any computer-readable medium except the computer-readable storage medium. The computer-readable signal medium may send, propagate, or transmit a program used by an instruction execution system, apparatus, or device, or a combination thereof. The program code included in the computer-readable medium may be transmitted by any appropriate medium, including but not limited to a wire, an optical cable, radio frequency (RF), or the like, or any appropriate combination thereof.

In some embodiments, a client or a server may communicate using any currently known or future developed network protocol such as hypertext transfer protocol (HTTP), and may be interconnected with digital data communication (such as a communication network) in any form or medium. Examples of the communication network include a local area networks ("LAN"), a wide area networks ("WAN"), an Internet work (such as the Internet), an end-to-end network (such as ad hoc end-to-end network), and any currently known or future developed network.

The computer-readable medium may be included in the foregoing apparatus, or exists alone and is not assembled into the electronic device. The computer-readable medium carries one or more programs that, when executed by the electronic device, enable the electronic device to: obtain a pre-constructed graph model related to a target item category, and serialized text data and structured text data related to a target item, where the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information; perform word segmentation on the serialized text data to obtain a word set; match a target word in the word set with the parameter names in the graph model and generate a matched graph model according to matching results; generate a fused graph model according to the structured text data and the matched graph model; and generate summary information of the target item according to the fused graph model.

Computer program code for executing operations in some embodiments of the present disclosure may be compiled using one or more programming languages or a combination thereof. The programming languages include object-oriented programming languages, such as Java, Smalltalk, or C++, and also include conventional procedural programming languages, such as "C" language or similar programming languages. The program code may be completely or partially executed on a user computer, executed as an independent software package, partially executed on a user computer and partially executed on a remote computer, or completely executed on a remote computer or server. In a case involving a remote computer, the remote computer may be connected to a user computer through any network including a local area network (LAN) or a wide area network (WAN), or may be connected to an external computer (for example, connected through the Internet by using an Internet service provider).

The flowcharts and block diagrams in the drawings illustrate system architectures, functions, and operations that may be implemented according to the systems, methods, and computer program products of various embodiments of the present disclosure. In this regard, each of the blocks in the flowcharts or block diagrams may represent a module, a program segment, or a portion of code, and the module, the program segment, or the portion of code includes one or more executable instructions for implementing specified logic functions. It should also be noted that in some optional implementations, the functions annotated in the blocks may also occur in a different order from the order annotated in the drawings. For example, two consecutive blocks may actually be executed substantially in parallel, or they may sometimes be executed in a reverse order, which depends on the involved functions. It should also be noted that each block in the block diagrams and/or flow charts, and a combination of the blocks in the block diagrams and/or flow charts, may be implemented by a dedicated hardware-based system that performs the specified functions or actions, or may be implemented by a combination of dedicated hardware and computer instructions.

The units described in some embodiments of the present disclosure may be implemented by software or hardware. The described units may alternatively be disposed in a processor, for example, described as: a processor includes: an obtaining unit, a word segmentation unit, a matching and generation unit, a first generation unit, and a second generation unit. Names of these units do not constitute limitations to the units in some cases. For example, the word segmentation unit may alternatively be described as "a unit for performing word segmentation on the serialized text data to obtain a word set".

The functions described above may be executed at least in part by one or more hardware logic components. For example, non-restrictively, exemplary types of hardware logic components that may be used include: a field programmable gate array (FPGA), an application specific integrated circuit (ASIC), an application specific standard product (ASSP), a system on chip (SOC), a complex programmable logic device (CPLD), and the like.

The above description is only for some preferred embodiments of the present disclosure and an explanation of the technical principles used. Those skilled in the art should understand that the scope of the invention referred to in the embodiments of the present disclosure is not limited to technical solutions formed by specific combinations of the foregoing technical features, but should also cover other technical solutions formed by any combination of the foregoing technical features or equivalent features without departing from the foregoing invention concept, such as technical solutions formed by mutual replacement between the foregoing features and technical features disclosed in the embodiments of the present disclosure (but not limited to) and having similar functions.

What is claimed is:

1. An information generation method, applied to an information generator, the information generator comprising a memory configured to store computer executable instructions and a processor configured to execute the computer executable instructions to implement the method, the method comprising:
   receiving a pre-constructed graph model related to a target item category, and serialized text data and structured text data related to a target item, wherein the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information;
   obtaining item information of each item under the target item category, wherein the item information comprises a parameter name and at least one parameter value;
   determining, according to the item information of each item, parameter content information corresponding to each parameter name and a frequency of appearance of each piece of the parameter content information in the item information of each item;
   and determining the numerical values corresponding to the edges in the graph model by using a term frequency-inverse document frequency method according to the parameter content information corresponding to each parameter name and the frequency of appearance of each piece of the parameter content information;
   performing word segmentation on the serialized text data to obtain a word set;
   matching a target word in the word set with the parameter names in the graph model and transforming matching results into a form of a graph to obtain a matched graph model;
   fusing the structured text data into the matched graph model to obtain a fused graph model, wherein the fused graph model represents structured text information related to the target item;
   and generating summary information of the target item according to the fused graph model.

2. The method according to claim 1, wherein the matching a target word in the word set with the parameter names in the graph model and transforming matching results into a form of a graph to obtain a matched graph model comprises:
   matching the target word in the word set with the parameter names in the graph model to obtain the matching results; and
   generating the matched graph model according to the matching results and target edges in the graph model, wherein the target edges are edges in the graph model that represent correlation information between the target word and the parameter names corresponding to the target word.

3. The method according to claim 1, wherein the generating summary information of the target item according to the fused graph model comprises:
   transforming the fused graph model into a corresponding vector matrix;
   determining a vector corresponding to each node in the fused graph model, wherein the vector corresponding to each node represents feature information of the parameter name or parameter content information; and generating the summary information of the target item according to the vector matrix and the vector corresponding to each node.

4. The method according to claim 3, wherein the generating the summary information of the target item according to the vector matrix and the vector corresponding to each node comprises:
inputting the vector matrix and the vectors corresponding to respective nodes in the fused graph model into a pre-trained graph convolutional network to obtain a first output result;
encoding the first output result to obtain a second output result; and
decoding the second output result to obtain the summary information of the target item.

5. The method according to claim 4, wherein the encoding the first output result to obtain a second output result comprises:
inputting the first output result into a pre-trained encoding network for processing temporal text data to obtain the second output result.

6. The method according to claim 4, wherein the decoding the second output result to obtain the summary information of the target item comprises:
inputting the second output result to a pre-trained decoding network for processing temporal text data to obtain the summary information of the target item.

7. The method according to claim 1, wherein the numerical values corresponding to the edges in the graph model are determined through the following steps:
obtaining item information of each item under the target item category, wherein the item information comprises a parameter name and at least one parameter value;
determining, according to the item information of each item, parameter content information corresponding to each parameter name and a frequency of appearance of each piece of the parameter content information in the item information of each item; and
determining the numerical values corresponding to the edges in the graph model by using a term frequency-inverse document frequency method according to the parameter content information corresponding to each parameter name and the frequency of appearance of each piece of the parameter content information.

8. An electronic device, comprising: at least one processor; and a storage apparatus, configured to store at least one programs, wherein the at least one programs, when executed by the at least one processor, enable the at least one processor to implement an information generation method, comprising:
receiving a pre-constructed graph model related to a target item category, and serialized text data and structured text data related to a target item, wherein the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information;
obtaining item information of each item under the target item category, wherein the item information comprises a parameter name and at least one parameter value;
determining, according to the item information of each item, parameter content information corresponding to each parameter name and a frequency of appearance of each piece of the parameter content information in the item information of each item;
and determining the numerical values corresponding to the edges in the graph model by using a term frequency-inverse document frequency method according to the parameter content information corresponding to each parameter name and the frequency of appearance of each piece of the parameter content information;
performing word segmentation on the serialized text data to obtain a word set;
matching a target word in the word set with the parameter names in the graph model and transforming matching results into a form of a graph to obtain a matched graph model;
fusing the structured text data into the matched graph model to obtain a fused graph model, wherein the fused graph model represents structured text information related to the target item;
and generating summary information of the target item according to the fused graph model.

9. A non-transitory non-volatile computer-readable medium, storing a computer program thereon, wherein an information generation method is implemented when the program is executed by a processor, the text generation method, comprising:
receiving a pre-constructed graph model related to a target item category, and serialized text data and structured text data related to a target item, wherein the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information;
obtaining item information of each item under the target item category, wherein the item information comprises a parameter name and at least one parameter value;
determining, according to the item information of each item, parameter content information corresponding to each parameter name and a frequency of appearance of each piece of the parameter content information in the item information of each item;
and determining the numerical values corresponding to the edges in the graph model by using a term frequency-inverse document frequency method according to the parameter content information corresponding to each parameter name and the frequency of appearance of each piece of the parameter content information;
performing word segmentation on the serialized text data to obtain a word set;
matching a target word in the word set with the parameter names in the graph model and transforming matching results into a form of a graph to obtain a matched graph model fusing the structured text data into the matched graph model to obtain a fused graph model, wherein the fused graph model represents structured text information related to the target item and generating summary information of the target item according to the fused graph model.

10. The method according to claim 2, wherein the generating summary information of the target item according to the fused graph model comprises:
transforming the fused graph model into a corresponding vector matrix;

determining a vector corresponding to each node in the fused graph model, wherein the vector corresponding to each node represents feature information of the parameter name or parameter content information; and generating the summary information of the target item according to the vector matrix and the vector corresponding to each node.

11. The method according to claim 5, wherein the decoding the second output result to obtain the summary information of the target item comprises:

inputting the second output result to a pre-trained decoding network for processing temporal text data to obtain the summary information of the target item.

12. The method according to claim 2, wherein the numerical values corresponding to the edges in the graph model are determined through the following steps:

obtaining item information of each item under the target item category, wherein the item information comprises a parameter name and at least one parameter value;

determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

13. The method according to claim 3, wherein the numerical values corresponding to the edges in the graph model are determined through the following steps:

obtaining item information of each item under the target item category, wherein the item information comprises a parameter name and at least one parameter value;

determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

14. The method according to claim 4, wherein the numerical values corresponding to the edges in the graph model are determined through the following steps:

obtaining item information of each item under the target item category, wherein the item information comprises a parameter name and at least one parameter value;

determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

15. The method according to claim 5, wherein the numerical values corresponding to the edges in the graph model are determined through the following steps:

obtaining item information of each item under the target item category, wherein the item information comprises a parameter name and at least one parameter value;

determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

16. The method according to claim 6, wherein the numerical values corresponding to the edges in the graph model are determined through the following steps:

obtaining item information of each item under the target item category, wherein the item information comprises a parameter name and at least one parameter value;

determining, according to the item information of each item, parameter content information corresponding to each parameter name and a frequency of appearance of each piece of the parameter content information in the item information of each item; and determining the numerical values corresponding to the edges in the graph model by using a term frequency-inverse document frequency method according to the parameter content information corresponding to each parameter name and the frequency of appearance of each piece of the parameter content information.

17. An electronic device, comprising: at least one processor; and a storage apparatus, configured to store at least one programs, wherein the at least one programs, when executed by the at least one processors processor, enable the at least one processor to implement the method, comprising:

receiving a pre-constructed graph model related to a target item category, and serialized text data and structured text data related to a target item, wherein the graph model represents a correlation between parameter names and parameter content information of the target item category, nodes in the graph model represent the parameter names or parameter content information of the target item category, and numerical values corresponding to edges in the graph model represent correlation information between the parameter names and the parameter content information;

obtaining and storing using the processor, item information of each item under the target item category, wherein the item information comprises a parameter name and at least one parameter value;

determining and storing, using the processor, according to the item information of each item, parameter content information corresponding to each parameter name and a frequency of appearance of each piece of the parameter content information in the item information of each item;

and determining and storing, using the processor, the numerical values corresponding to the edges in the graph model by using a term frequency-inverse document frequency method according to the parameter content information corresponding to each parameter name and the frequency of appearance of each piece of the parameter content information;

performing and storing using the processor, word segmentation on the serialized text data to obtain a word set;

matching and storing using the processor a target word in the word set with the parameter names in the graph model and transforming matching results into a form of a graph to obtain a matched graph model fusing the structured text data into the matched graph model to obtain a fused graph model, wherein the fused graph model represents structured text information related to the target item;

and generating summary information of the target item according to the fused graph model.

18. An electronic device, comprising: at least one processor; and a storage apparatus, configured to store at least one programs, wherein the at least one programs, when executed by the at least one processor, enable the at least one processor to implement the method according to to claim 17, wherein the generating summary information of the target item according to the fused graph model comprises: transforming the fused graph model into a corresponding vector matrix; determining a vector corresponding to each node in the fused graph model, wherein the vector corresponding to each node represents feature information of the parameter name or parameter content information; and generating the summary information of the target item according to the vector matrix and the vector corresponding to each node.

19. A non-volatile computer-readable medium, storing a computer program thereon, wherein the method according to claim 17 is implemented when the program is executed by a processor, wherein the matching a target word in the word set with the parameter names in the graph model and transforming matching results into a form of a graph to obtain a matched graph model comprises: matching the target word in the word set with the parameter names in the graph model to obtain the matching results; and generating the matched graph model according to the matching results and target edges in the graph model, wherein the target edges are edges in the graph model that represent correlation information between the target word and the parameter names corresponding to the target word.

* * * * *